United States Patent [19]

Takata

[11] Patent Number: 5,370,200
[45] Date of Patent: Dec. 6, 1994

[54] BICYCLE WITH ELECTRIC MOTOR

[75] Inventor: Nozomu Takata, Iwata, Japan

[73] Assignee: Yamaha Hatsudoki Kabushiki Kaisha, Iwata, Japan

[21] Appl. No.: 59,540

[22] Filed: May 10, 1993

[30] Foreign Application Priority Data

May 11, 1992 [JP] Japan .................................. 4-143741
Feb. 25, 1993 [JP] Japan .................................. 5-059365

[51] Int. Cl.$^5$ ...................... B62K 11/00; B62M 23/02
[52] U.S. Cl. .................... 180/206; 180/65.2; 180/205; 180/220; 280/214; 318/139; 318/452
[58] Field of Search ............... 180/220, 212, 214, 206, 180/205, 219, 65.1, 65.2, 65.6; 280/212, 214; 318/139, 445, 449, 452, 461, 466

[56] References Cited

U.S. PATENT DOCUMENTS

| 4,364,448 | 12/1982 | Ikuma | 180/206 |
| 5,024,286 | 6/1991 | Lean et al. | 180/206 |
| 5,226,501 | 7/1993 | Takata | 180/206 |

FOREIGN PATENT DOCUMENTS

| 0517224 | 12/1992 | European Pat. Off. . |
| 2259741 | 8/1975 | France . |
| 50-125438 | 2/1975 | Japan . |
| 2-74491 | 3/1990 | Japan . |

OTHER PUBLICATIONS

Pat. Abs. of Japan, vol. 14, No. 113 (M-0944) 2 Mar.1990 & JP-A-13 14 685 (Japan II M KK) 19 Dec. 1989.
Pat. Abs. of Japan, vol. 14, No. 262 (M-0981) 6 Jun. 1990 & JP-A-20 74 491 (Matsushita Electric Works Ltd.).

Primary Examiner—Mitchell J. Hill
Attorney, Agent, or Firm—Knobbe, Martens, Olson & Bear

[57] ABSTRACT

Several embodiments of pedal operated vehicles such as bicycles wherein electric motor assist is provided in response to the pedaling force applied by the rider. However, a number of embodiments of malfunction detection devices are disclosed and which will preclude the application of electric motor assist if the system has been disabled or if it is not operating properly. In addition, a start up routine is also disclosed that prevents the sudden application of electric power upon starting of the system.

29 Claims, 10 Drawing Sheets

BICYCLE WITH ELECTRIC MOTOR

BACKGROUND OF THE INVENTION

This invention relates to a bicycle with an electric motor and more particularly to an electric motor assisted, pedal operated vehicle.

There have been proposed pedal operated vehicles such as bicycles wherein there is provided an electric motor which is designed so as to assist the operator in the pedal operation. These electric motor assists may be employed to provide added power when going up hills or for infirmed people. However, the construction is such that the amount of electric assist is proportional to the force which the operator puts on the pedal. In this way, it will be insured that safety can be maintained and that the operator will still obtain the benefit of physical exercise when operating the vehicle.

Normally, these type of devices incorporate some form of force sensing mechanism, generally on the output side of the pedal operator, at which the operator's pedaling force is being sensed. These force sensors thus do not actually sense directly the force which the operator exerts with his feet but rather the output force of the pedal mechanism. It should be noted that because of the crank angle of the pedal mechanism, a given operator force will provide a cyclically varying output force from the pedal mechanism. This force varies from a minimum force when the pedals are at top or bottom dead center and a maximum force when the pedals are at 90° from top or bottom dead center positions.

Although these types of mechanism are quite useful and serve well their intended purposes, there are some areas which can be improved. For example, it is desirable to insure that the user cannot inadvertently bypass the force sensing mechanism so as to provide electric power which is not related to the pedal force mechanism. In addition, the pedal force sensing mechanism, being a mechanical device and being subject to the elements, can be subject to corrosion or other factors that can cause the force sensing mechanism to provide an incorrect or inaccurate force signal.

The ways in which these inaccurate signals can occur may be understood by reference to FIGS. 1 through 3 which are graphical views that show the force sensing signal from the pedal torque sensor in the curves $F_{L1}$, $F_{L2}$ and $F_{L3}$, which show the actual pedaling force transmitted from the operator to the pedals and outputted from the crank mechanism by the broken line curve P and a predetermined minimum output force $F_{L0}$. The dot dash (. -) curve $F_{L0}$ normally represents the minimum force which must be exerted by the pedals before the electric motor assist occurs.

FIG. 1 shows a condition when the operator has intentionally bypassed the output of the force sensor so as to provide an output signal $F_{L1}$ which is at a fixed value. If this is done, then the electric motor which assists the pedal mechanism will operate continuously at a relatively high output. This can present a number of disadvantages.

FIG. 2 is a view showing the condition that will happen if the torque sensor has friction which retards it from returning to its normal state once the maximum torque is sensed and the torque decreases. The output signal $F_{L2}$ will be seen to fall off less gradually than the pedal force P and when the pedal force P again increases to the fallen level of the sensor $F_{L2}$, then the torque sensor will again track actual torque until the peak is again passed. As a result, unnecessarily high electric motor assist will occur.

FIG. 3 shows another type of malfunction which can occur if an obstruction occurs somehow in the torque sensor so that the torque sensor can only fall to a predetermined low torque indicated by the horizontal line of the torque curve $F_{L3}$. Above this point, the actual torque will be sensed but no lower torque signals will sensed. Again, this will provide an inaccurate reading and excessive electric motor assist.

It is, therefore, a principal object to this invention to provide an improved type of electric motor assist for a pedal operated vehicle wherein the system will assure against incorrect electric motor assist.

It is a further object to this invention to provide an electric motor assisted power pedal operated vehicle wherein the operator cannot intentionally bypass the output of the torque sensor.

It is a further object to this invention to provide an electric motor assisted pedal operated vehicle mechanism wherein the system will not provide excess electric power assist in the event of some malfunction in the output of the torque sensor.

In connection with such electrically assist pedal operated vehicles, it has already been noted that the electric motor assist is related to the actual pedaling force. However, when starting up, the operator may exert a very high force on the pedals and if this force is transmitted into a proportionate electric motor assist, too much assist may be provided.

It is, therefore, a still further object to this invention to provide an electric motor assisted pedal operated vehicle wherein the electric assist on start up is retarded so as to insure against abrupt increase in electric motor assist during start up.

SUMMARY OF THE INVENTION

This invention is adapted to be embodied in an electrically assisted pedal operated vehicle that has a vehicle propulsion device. Pedal means are provided for operation by a rider for driving the propulsion device. Force sensing means provide a signal indicative of the force applied by the rider to the pedal means. An electric motor is provided which is coupled to the propulsion device for applying a driving force to the propulsion device. Operating means operate the electric motor in response to the signal from the force sensing means for providing an electric motor assist to the pedal operation of the propulsion device. Means are provided for comparing the signal from the force sensing means with a predetermined condition for varying the operation of the operating means to change the amount of assist provided by the electric motor in the event of a predetermined condition.

In accordance with one feature of the invention, if it is determined that the force sensing means is providing a signal which is believed to be incorrect or bypassed due to the comparison with the predetermined condition, then the power assist is disabled.

In accordance with another feature of the invention, if the force output from the force sensing means indicates that the rider is pedaling at a very low speed, then the power assist is disabled.

In accordance with another feature of the invention, the amount of power assist generated during start up is reduced in proportion to the load applied to avoid sudden applications of power assist.

DETAILED DESCRIPTION OF THE PREFERRED EMBODIMENTS OF THE INVENTION

Figure 4:
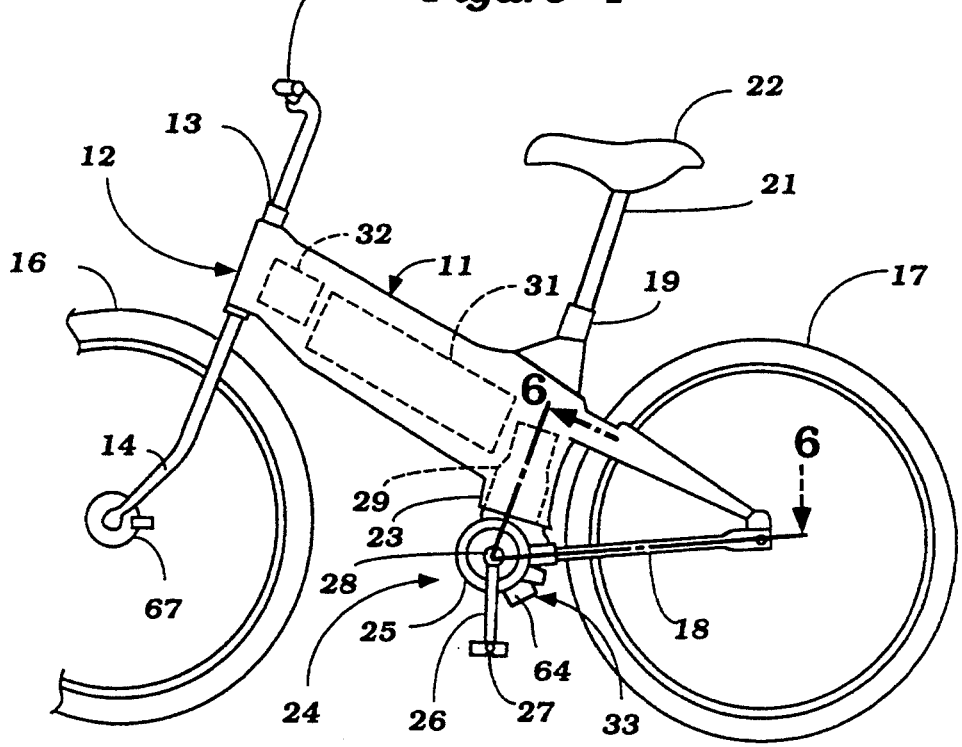
FIG. 4 is a side elevational view of a bicycle constructed and operated in accordance with a first embodiment of the invention.

Referring first to FIG. 4, a bicycle constructed in accordance with an embodiment of the invention is identified generally by the reference numeral 11. The bicycle 11 includes a frame assembly, indicated generally by the reference numeral 12, having a head tube 13 which journals a front fork 14 for steering movement under the control of a handlebar 15. A front wheel 16 is rotatably journalled by the front fork 14 in a well known manner.

A rear wheel 17 is journalled at the rear end of the frame assembly 12 by means including a pair of rear stays 18 which extend on opposite sides of the rear wheel 17. One of the these stays 18 contains a drive for the rear wheel 17, as will be described.

A seat tube 19 is carried by the frame assembly 12 adjacent the rear wheel 17 and supports a seat post 21 upon which a saddle type seat 22 is positioned in a known manner.

Beneath the seat tube 19, the frame 12 is provided with a bottom bracket 23 which supports in part a drive mechanism, indicated generally by the reference numeral 24. The drive mechanism 24 is comprised of a manual drive consisting of a crank journalled in a case 25 which is fixed to the bottom bracket 23 by fasteners 20 and having a pair of crank arms 26 upon which pedals 27 are rotatably journalled in a known manner. The crank is connected to a crankshaft 28 for manual rotation of the rear wheel 17 in a manner which will be described.

In addition, an electric motor, indicated generally by the reference numeral 29 is accommodated in the lower bracket 23 and also is adapted to drive the rear wheel 17 in a manner which will be described. The electric motor 29 is powered by a rechargeable type of battery 31, such as a lead battery, and which is controlled by means of a controller 32, both of which are mounted in the upper portion of the frame assembly 12.

Figure 7:
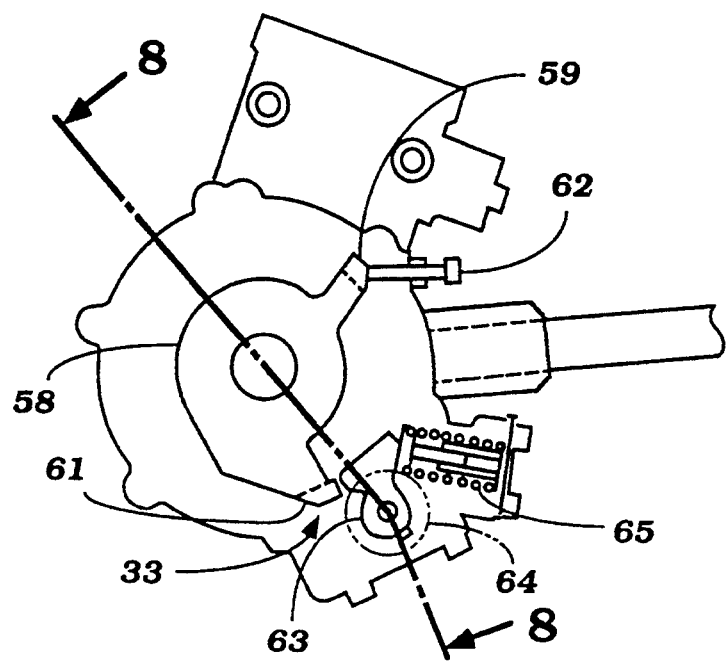
FIG. 7 is an enlarged side elevational view showing the relationship of the torque sensor to the other components.
Figure 8:
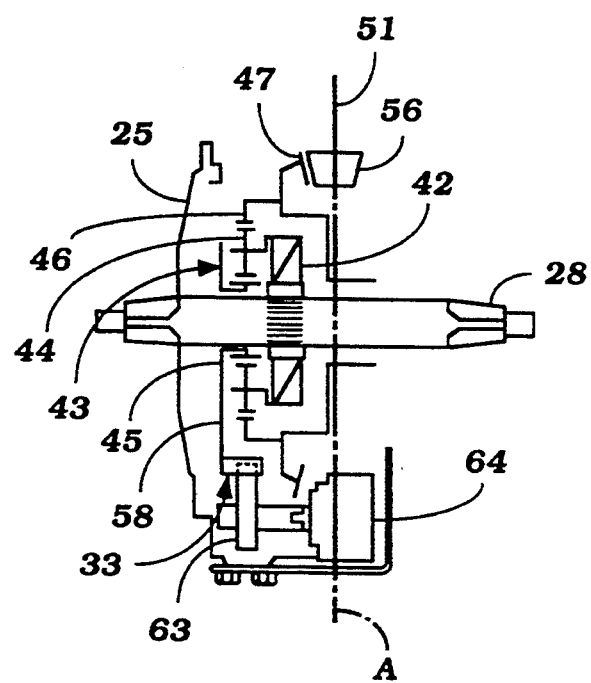
FIG. 8 is a cross sectional view taken along the line 8—8 of FIG. 7.

In addition, a pedal force sensor 33 is mounted on the crank assembly. The way in which the pedal force sensor 33 operates will be described later by particular reference to FIGS. 7 and 8.

Figure 5:
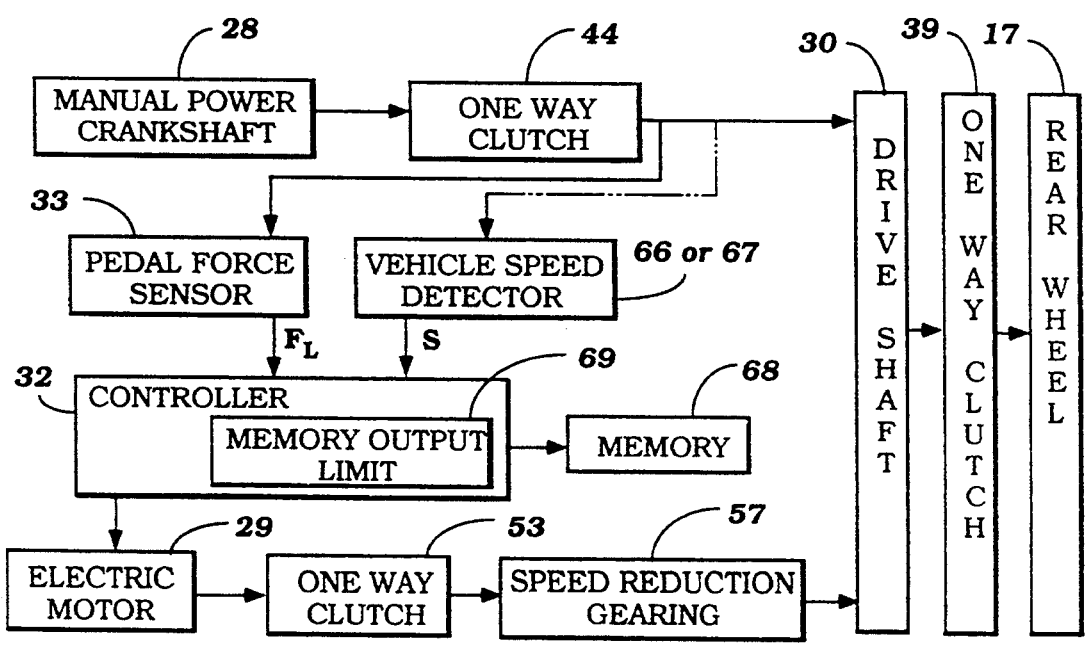
FIG. 5 is a partially schematic view showing the interrelationship of the various components of the system.

The details of the drive arrangement for driving the rear wheel 17 will now be described by particular reference to FIGS. 4 through 8, with FIG. 5 showing the relationship of the components in schematic form, while FIGS. 4 and 6–8 show the actual physical construction.

Figure 6:
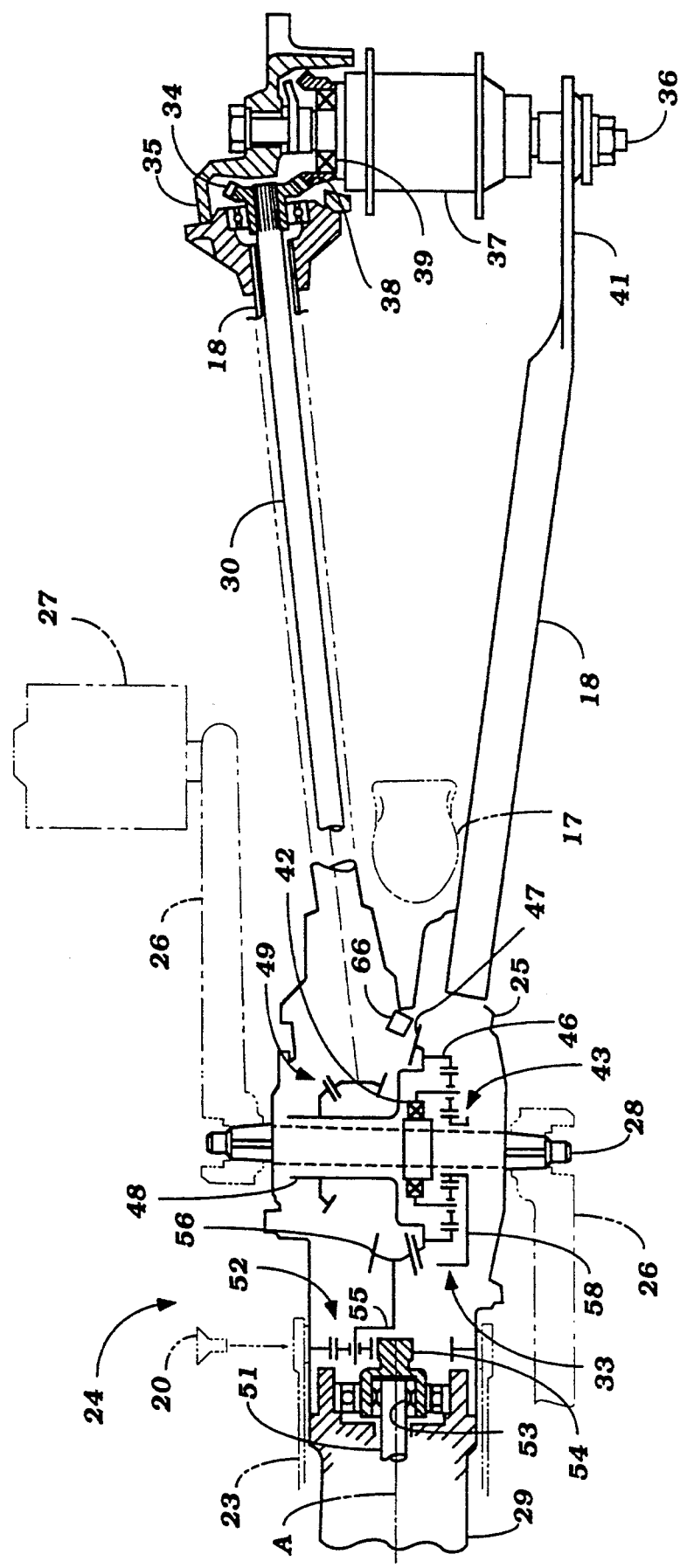
FIG. 6 is an enlarged cross sectional view taken generally along the line 6—6 of FIG. 4 and shows the driving mechanism and its interrelationship with the driven wheel.

It may be seen in FIG. 6, one of the back stays 18 is tubular in configuration and passes a drive shaft 30 which carries a bevel gear 34 at its rear end. This bevel gear 34 is contained within a housing 35 formed at the end of this side of the back stay 18 and which housing also supports an axle 36 of the rear wheel 17 in a fixed manner. The axle 36 journals a hub 37 which carries a driven bevel gear 38 which is enmeshed with the driving bevel gear 34 of the drive shaft 30. The driven bevel gear 38 is coupled by means of a one-way clutch 39 to the rear wheel hub 37 so as to drive the hub 37 and rear wheel 17. However, the one-way clutch 39 will permit overrunning during coasting so that the rear wheel 17 may coast freely relative to the drive shaft 30.

The back stay 18, at the opposite side from the drive shaft 30 is formed with a flattened portion 41 to which the other side of the axle 36 is affixed in any known manner.

The drive shaft 30 may be driven by the crankshaft 28 under manual power and by the electric motor 29 for power assist in the manner which will now be described. This construction still is described by reference to FIGS. 4 through 8.

For mechanical operation by the pedals 27, the crankshaft 28 is coupled by means of a one-way clutch 42 to a speed increasing planetary gear set, indicated generally by the reference numeral 43. Specifically, the way-one clutch 42 interconnects the crankshaft 28 to a planet carrier on which planet gears 44 are rotatably journalled. The planet gears 44 are enmeshed with a sun gear 45 that is affixed to the torque sensor 33 in a manner which will be described. The planet gears 44 further are engaged with a ring gear 46 which, in turn, is affixed to a bevel gear 47.

The bevel gear 47 is, in turn, affixed to a resulting force shaft 48 which is journalled around the crankshaft 28 and which has a bevel gear connection 49 for driving the drive shaft 30. Hence, rotation of the crankshaft 28 by operating the pedals 27 will effect driving of the drive shaft 30 through the one-way clutch 42 and planetary transmission 43 which, in turn, drives the resulting force shaft 48 and bevel gear transmission 49. The one-way clutch 42 will prevent driving of the crank assembly 28 by the motor 29.

Referring now to the electric motor drive 29 and the way in which the electric motor is coupled to the drive shaft 30, this construction also appears in FIGS. 4 through 8. The electric motor 29 is mounted within the frame 12 so that its output shaft 51 rotates about an axis "A" (FIG. 8) which is disposed substantially midway of the transverse side of the frame assembly 12 and which extended perpendicularly to the axis of rotation of the crankshaft 28. The motor output shaft 51 drives a further planetary gear reduction set, indicated generally by the reference numeral 52 through a one-way clutch 53 which permits the drive to be transmitted, but which prevent driving of the motor shaft 51 when the motor 29 is not energized.

The planetary transmission 52 includes a sun gear 54 which is driven by the one-way clutch 53 and which is enmeshed with a plurality of planet gears carried on a planetary carrier 55. The planetary carrier 55 is, in turn, affixed to a bevel gear 56 which is enmeshed with the bevel gear 47 so as to also drive this bevel gear 47. The planet gears on the carrier 55 are also engaged with a fixed ring gear which is held to the case 25 in a suitable manner. The planetary transmission 52 is of the speed reducing type so that the bevel gear 56 will be driven at a lower speed than the electric motor drive shaft 51.

The pedal force sensor 33 will now also be described by reference to the same figures. This mechanism includes a lever 58 which is affixed to the sun gear 45 at one side of the assembly and which carries a pair of lugs 59 and 61. The lug 59 is adapted to engage, in one extreme position, a fixed stop 62 carried by the frame portion 23. The lug 61, on the other hand, is adapted to engage a second lever 63 which is affixed to the shaft of a potentiometer 64 and which, in turn, is engaged by a resilient damper 65, so that the rotation of the lever 63 and potentiometer 64 will indicate the amount of pedal force exerted by the operator on the crankshaft 28. This pedal force is then used, in the manner now to be described, so as to control the operation of the electric motor 29.

There are two additional components of the system which will be described and these components include a vehicle speed detector 66 which, in FIG. 6 is illustrated as being an inductive device that cooperates with the ring gear 48 so as to provide a speed signal indicative of speed of the bicycle 11. Alternatively, a front wheel mounted speedometer 67 (FIG. 4) can be employed. The system further includes a memory 68 (FIG. 3) which memorizes certain data such as the speed of the electric motor $N_O$ for a given vehicle speed S and the motor torque $T_M$ which corresponds to the pedal force $F_L$.

The system as thus far described may be considered to be the same as that shown in the co-pending application entitled "Bicycle With Electric Motor", Ser. No. 026,868, filed Mar. 5, 1993, in the names of, Nozomu Takata and Tatsuji Yokoyama, assigned to the Assignee hereof. With that type of system, however, there can be some areas which are succeptable of improvement. For example, if the pedal force sensor 33 and specifically either the potentiometer 63 or the lever 58 bind, then they may not provide an accurate indication of actual pedal force.

Referring again to FIGS. 1 through 3, FIG. 2 shows an arrangement where there is some binding in the system and the spring 65 does not immediately return the potentiometer 63 into contact with the lever 58 so as to indicate the force reduction. Alternatively, the potentiometer 63 may actually stick in a position which prevents full return and thus will only provide a lower force signal $F_{L3}$ as shown in FIG. 3. Also, there is a possibility that either inadvertently or intentionally the operator could bypass the pedal force sensor and provide a constant force signal $F_{L1}$ (FIG. 1) to the device so that the electric motor 29 would be energized at all times. This is not always desirable.

Figure 9:
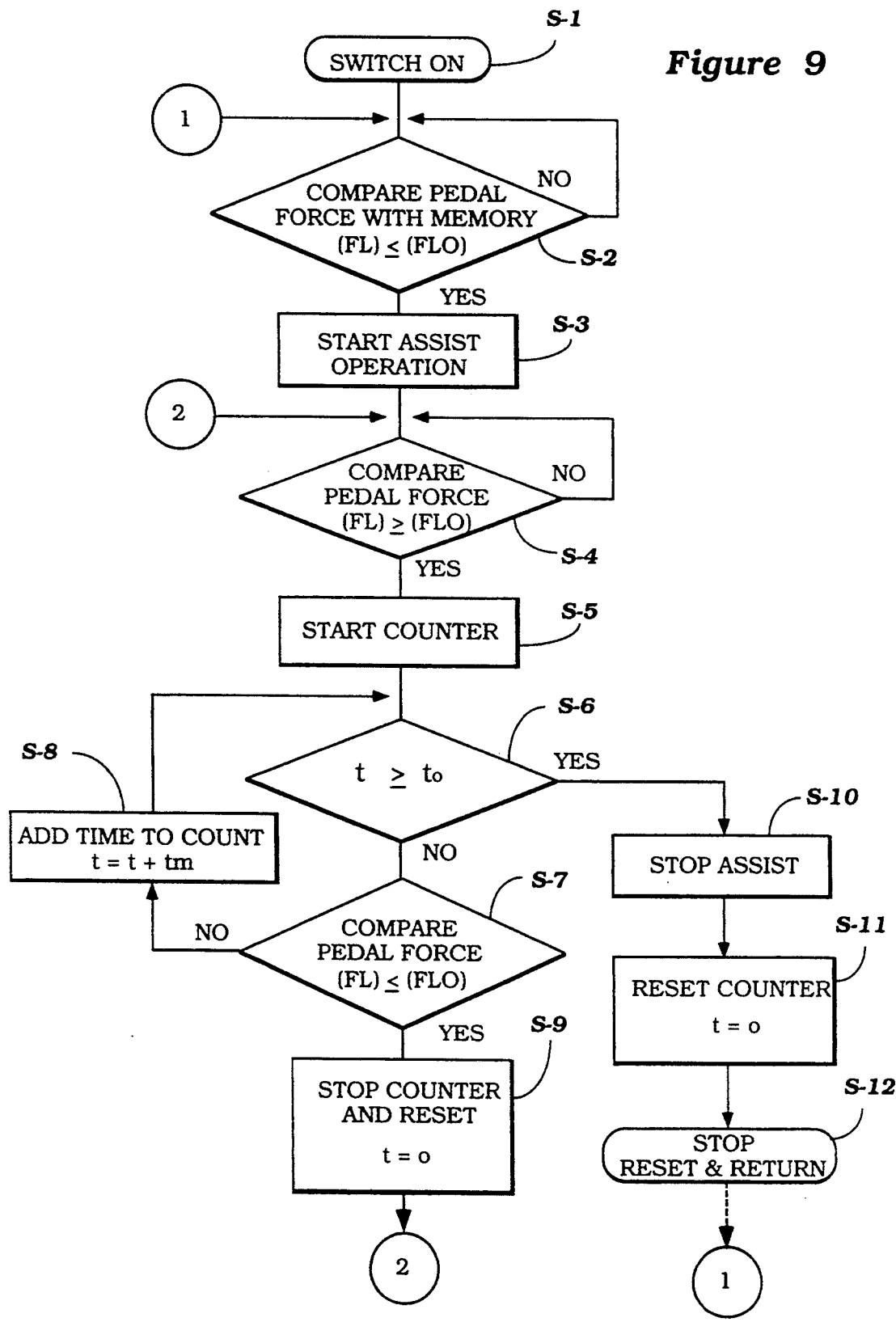
FIG. 9 is a block view showing the control routine in accordance with an embodiment of the invention.

Therefore, in accordance with the system, the controller 32 further includes an additional memory output limit 69 and operates so as to self check the system and if it is determined that there is a failure of the type previously noted, the system will shut down. The way this is done in this embodiment is illustrated in the block diagram of FIG. 9 which shows the control routine for the controller 32. Referring now specifically to FIG. 9, the program starts at the step S-1 when the power switch for energizing the circuit for the electric motor 29 is turned on. The program then moves to the step S-2 to compare the actual pedal force $F_L$ with the memory output limit 69 which sets a low force $F_{L0}$ which indicates the minimum force which normally must be exerted for power assist to occur. If the force applied by the pedals as sensed by the pedal force sensor 33 is not above the force $F_{L0}$ or equal to it, the program repeats to the point 1.

If, however, it is determined that the pedal force $F_L$ as sensed by the pedal force sensor 33 is greater than the memory value $F_{L0}$, the program then moves to the step S-3 to provide the starting of the assist operation. The assist operation then will control the electric motor 29 so as to provide a power assist that is proportional to the actual pedal force exerted by the operator as described in the aforenoted co-pending application or in any well known conventional manner as applied in this art.

The program then moves to the step S-4 so as to determine if the pedal force is still greater than the minimum pedal force $F_{L0}$ set in the memory 69. If the pedal force is greater than this, the program then moves to the step S-5 to start a counter. This counter may be conveniently formed as part of the controller 32 and is set for a predetermined time, as will become apparent.

Once the counter is started at the step S-5, the program moves to the step S-6 to compare the time in the counter "t" with a predetermined maximum length of time "$t_0$". The maximum time $t_0$ is the time period which is pre-programmed to indicate the maximum time anticipated or desired between the periods when the pedal force is in excess of $F_{L0}$, the predetermined minimum pedal force desired. That is, once the power assist is begun because the force at the pedal $F_L$ is greater than the force $F_{L0}$, the system reacts to determine that the force must again fall below the force $F_{L0}$ in a predetermined time or one of the conditions shown in FIGS. 1 through 3 will have been determined to have happened.

Figure 1:
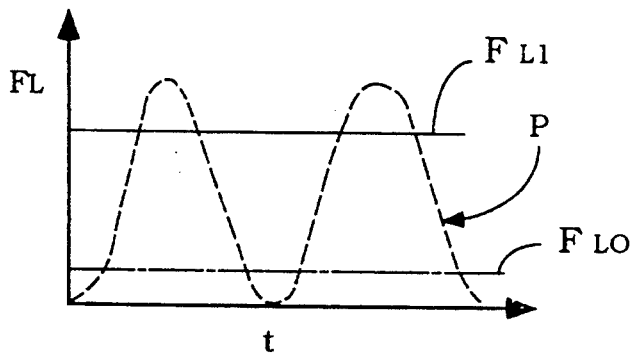
FIGS. 1 through 3 are graphical views showing the relationship of forces to time during a single cycle of pedal operation so as to depict three different modes of possible malfunctioning or bypassing.
Figure 2:
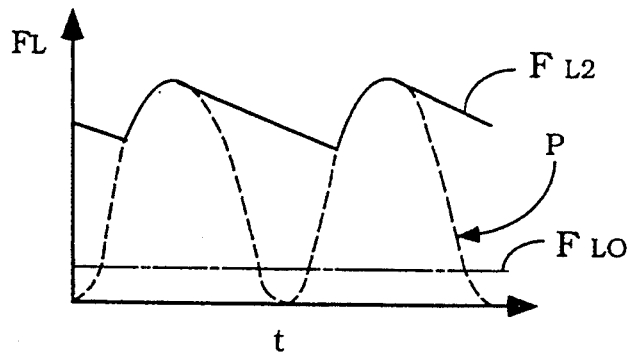
Figure 3:
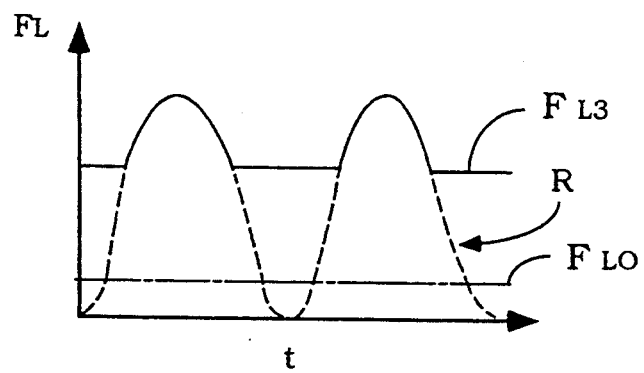

That is, with an operator normally pedaling the bicycle, the pedal force as sensed at the output from the sensor 33 must fall toward zero (0) when the crank mechanism goes over top dead center as seen by the curve P in FIGS. 1 through 3. If the force does not fall below the force $F_{L0}$ within a predetermined time period, it can be assumed that the system has either been disabled or has malfunctioned. Alternatively, the operator may be riding the bicycle at such a low speed that a force assist is not desirable or necessary.

Thus, if at the step S-6 the time period t has not exceeded the predetermined maximum time period $t_0$, the program moves to the step S-7 to again compare the pedal force $F_L$ with the predetermined minimum pedal force $F_{L0}$. If the pedal force as sensed by the sensor 33 has now fallen so that the pedal force is equal to or less than the predetermined minimum pedal force, the program then moves to the step S-8 to add a time count to the counter (t=t+m). The program then returns to the step S-6 to again determine if the time t is greater than a predetermined maximum time period $t_0$. If the time period when the pedal force is less than $F_{L0}$ exceeds the time period $t_0$, then the system determines that the operator is pedaling at a very low rate of speed and it is determined that power assist is not required and then the program defaults to the control routine which will be described later, that stops the assist operation.

If, however, at the step S-7 it is determined that the pedal force is less than the force $F_{L0}$, then it is determined that normal pedaling is being encountered and the system is operating normally because the pedal force will have fallen below this force and thus is following the broken line curves of FIGS. 1 through 3. The program then moves the step S-9 to stop the counter from running and reset the system. The program then skips back to the step S-4 at the point 2 to again compare the pedal force with the minimum pedal force $F_{L0}$. It is to be understood that the pedal force has already been determined at least initially, at the force $F_{L2}$ to be less than the force $F_{L0}$ so the system at this point determines that everything is operating normally.

If at the step S-6 it is determined that the time period has exceeded the time $t_0$ either because of the fact that the counter has been reading a pedal force greater than $F_{L0}$ for a predetermined maximum time $t_0$ or the pedal force sensor has been sensing a force less than the force $F_{L0}$ for the time period $t_0$, the program then moves to the default operation starting at the step S-10 wherein power assist is stopped. The program then moves to the step S-11 to reset the counter to zero (0). The program then moves to the step S-12 to reset and return the operation to the point 1 on the flow diagram.

Thus, it should be readily apparent that this method of operation is effective in insuring that the power assist of the electric motor 29 will only be provided when the sensor 33 is detected to being operating in a normal mode as cycling between a force greater than the force $F_{L0}$ and a force less than or equal to the force $F_{L0}$ in the predetermined time period $t_0$. If these conditions are not met, then it is determined that either there is an error in the system or the operator is pedaling so slowly that power assist is not required.

Figure 10:
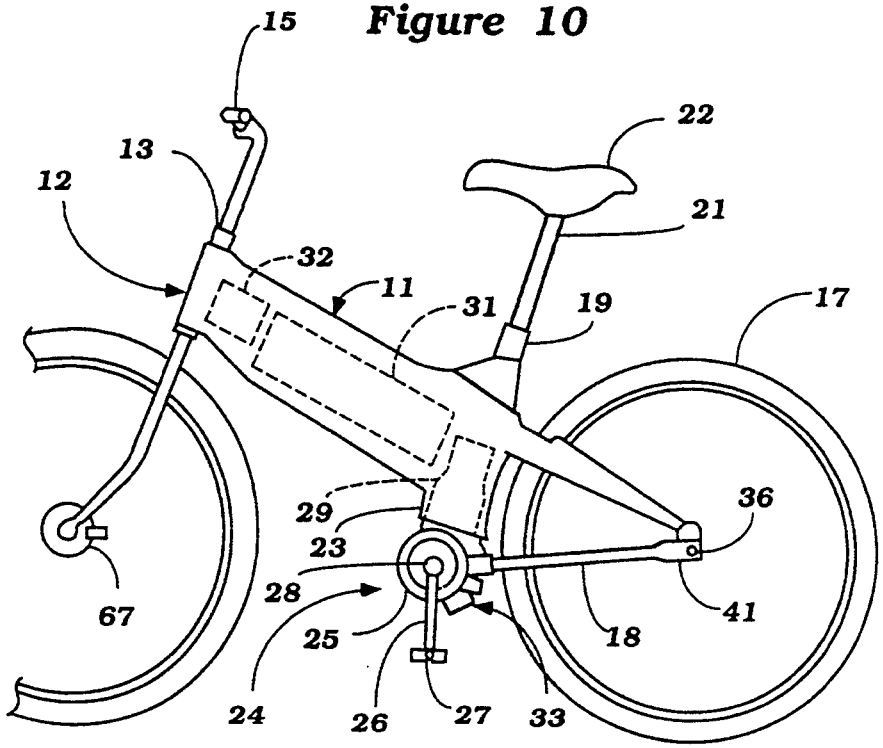
FIG. 10 is a side elevational view, in part similar to FIG. 4, and shows a bicycle constructed in accordance with another embodiment of the invention.
Figure 11:
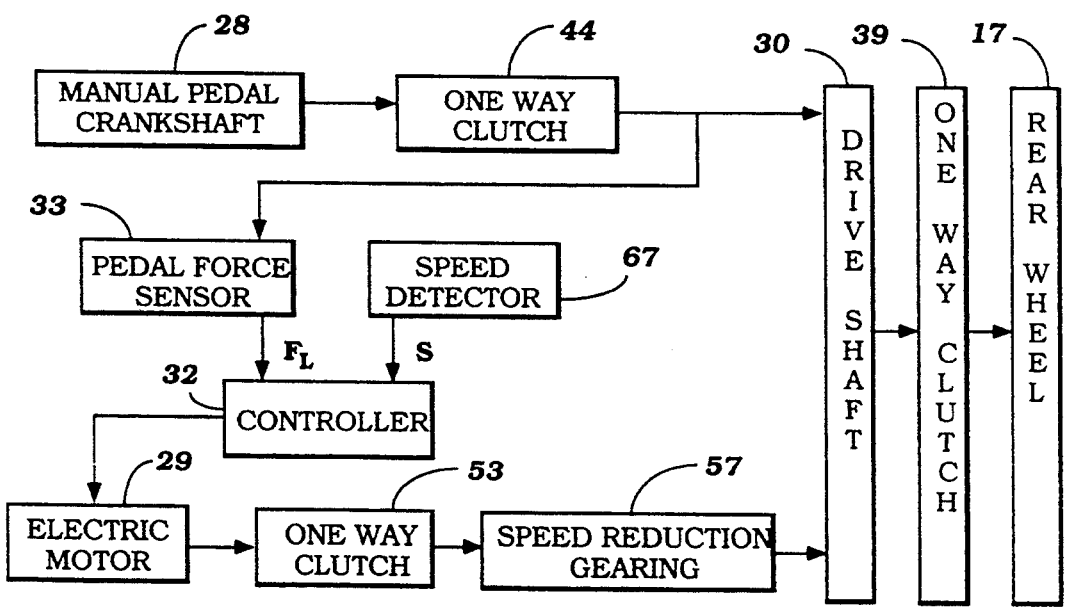
FIG. 11 is a schematic block diagram, in part similar to FIG. 5, but shows the interrelationship between the elements of this embodiment.

A bicycle constructed and operated in accordance with another embodiment of the invention is shown in side elevational view in FIG. 10 and in block schematic view in FIG. 11. Basically the construction of the bicycle of this embodiment is substantially the same as the previously described embodiment and, for that reason, components which are the same or substantially the same have been identified by the same reference numerals and will not be described again in detail. In this embodiment, however, the bicycle 11 is provided only with a front wheel speed sensor 67.

Figure 12:
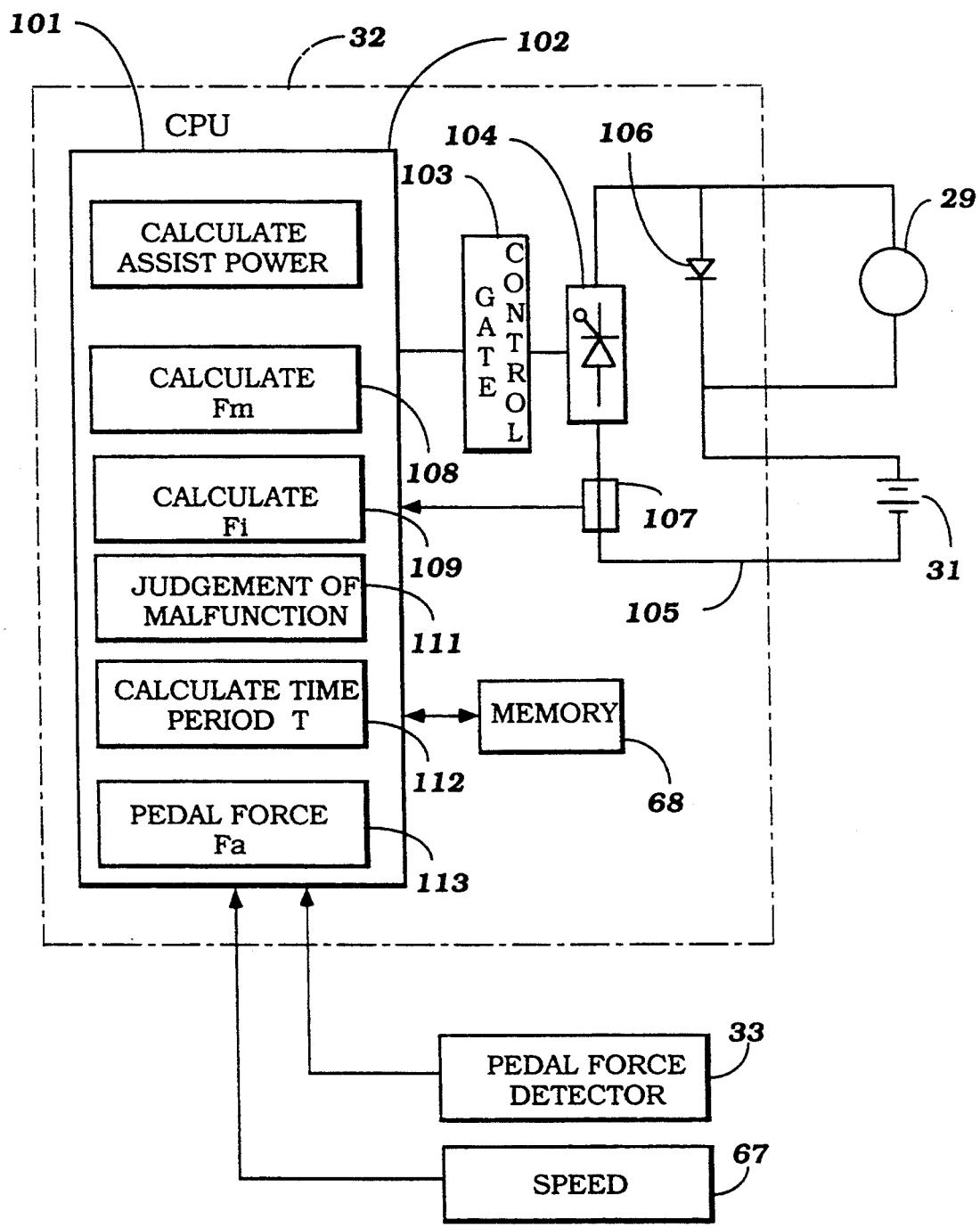
FIG. 12 is a partially schematic view showing the control elements and their interrelationship of this embodiment

The normal control for the electric motor assist 29 may be of any conventional type or may be of the type shown in aforenoted co-pending application Ser. No. 026,868, filed Mar. 5, 1993. However, this embodiment differs from the previous embodiment in the way in which the failure mode is detected and also in providing an improved start up power assist. The electrical control for the system is shown schematically in FIG. 12 wherein the controller 32 and interrelationship between the battery 31 and electric assist motor 29 is depicted in more detail.

The controller 32 includes a CPU 101 that has a number of sections including a section 102 which calculates the assist power to be supplied by the motor 29 utilizing the memory 68. The CPU 101 controls a circuit 103 that switches a SCR 104 so as to supply electrical power from the battery 31 to the motor 29 through a circuit 105. The circuit 105 includes a protecting diode 106 and a power tap 107 that supplies electrical power to the CPU 101.

The CPU 101 further has a section 108 which calculates the minimum force $F_m$, a section 109 that calculates the force difference $F_i$ between the actual pedal force $F_a$ and the lower limit pedal force $F_m$, a section 111 that determines when there is a malfunction situation, a section 112 that calculates the cycle pedal period T and a section 113 that calculates the actual pedal force $F_a$ from the output of the pedal force detector 33.

Basically the way this system operates to detect a failure mode is to measure the change in pedal force and to set a flag when the pedal force is increasing and to lower the flag when the pedal force is decreasing so as to measure the pedal cycle time. If the pedal cycle time is greater than a predetermined minimum time, then a system failure is sensed and the power assist is discontinued. In addition, a lower force limit $F_m$ is constantly reset based upon previously recorded values. The minimum pedal force $F_m$ is initially set high and the power assist is determined by the force difference $F_i$ between the actual pedal force $F_a$ and the lower limit pedal force $F_m$. As a result, during initial start up low power assist is provided and the power assist is gradually increased. In this way, there is a slow start up for the power assist and the rider will not be startled by a sudden power assist.

Figure 13:
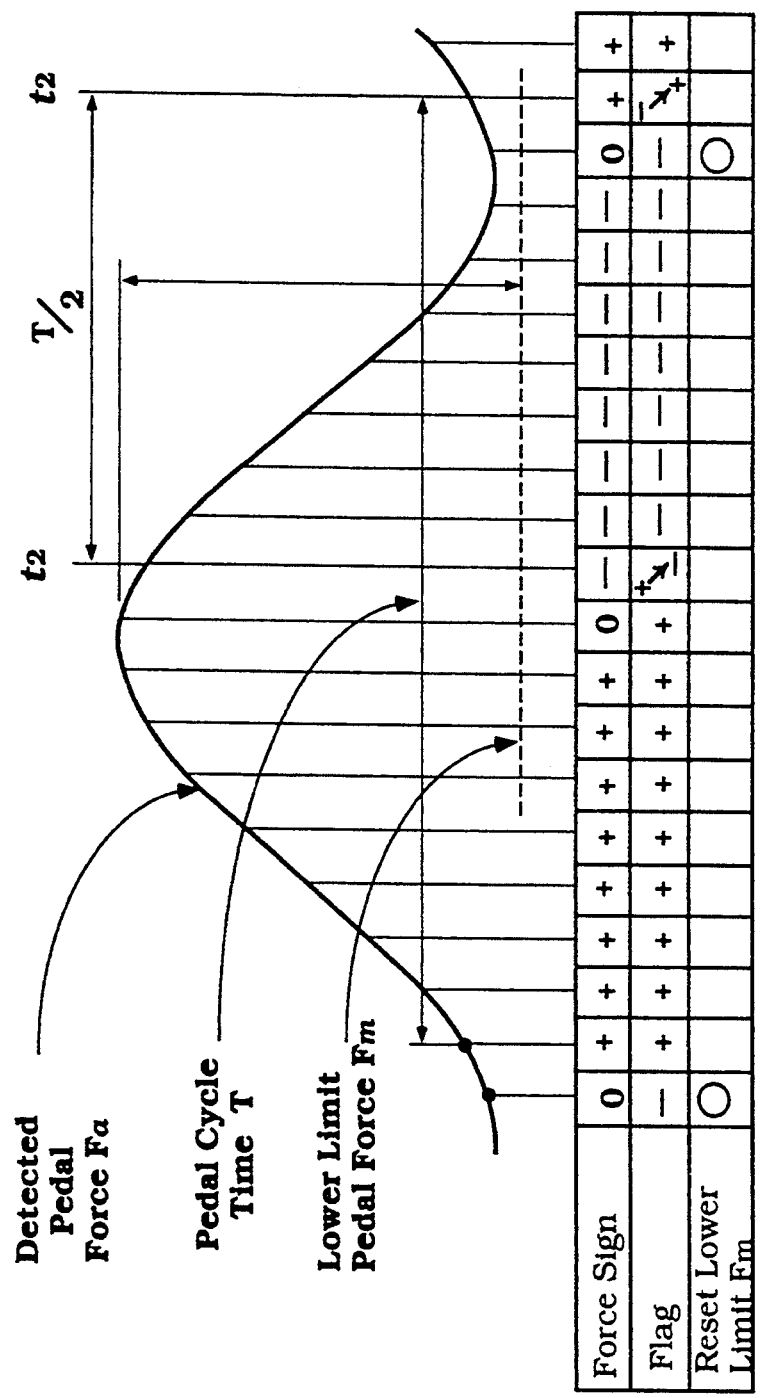
FIG. 13 is a graphical view showing how the mechanism operates in accordance with the counting.

The relationship of the pedal force $F_a$ and the way in which the flags are set or lowered and the lower limit pedal force $F_m$ is reset, may be seen in FIG. 13 which shows an area slightly greater than one half of a revolution of the pedals or one cycle of operation from minimum pedal force to maximum pedal force and back to minimum pedal force as the operator moves the crank from top dead center position through the 90° maximum force position and to bottom dead center position. It will be seen that at top and bottom dead centers the actual force approaches zero (0) with the force gradually building up to the 90° position and then decreasing back toward zero (0) force at the bottom dead center position. Each time the sign of the force change (increasing=plus (+), decreasing=minus (−)), the flag is either set or lowered. At the completion a full cycle time the lower limit $F_m$ value is reset within the controller 36.

Figure 14:
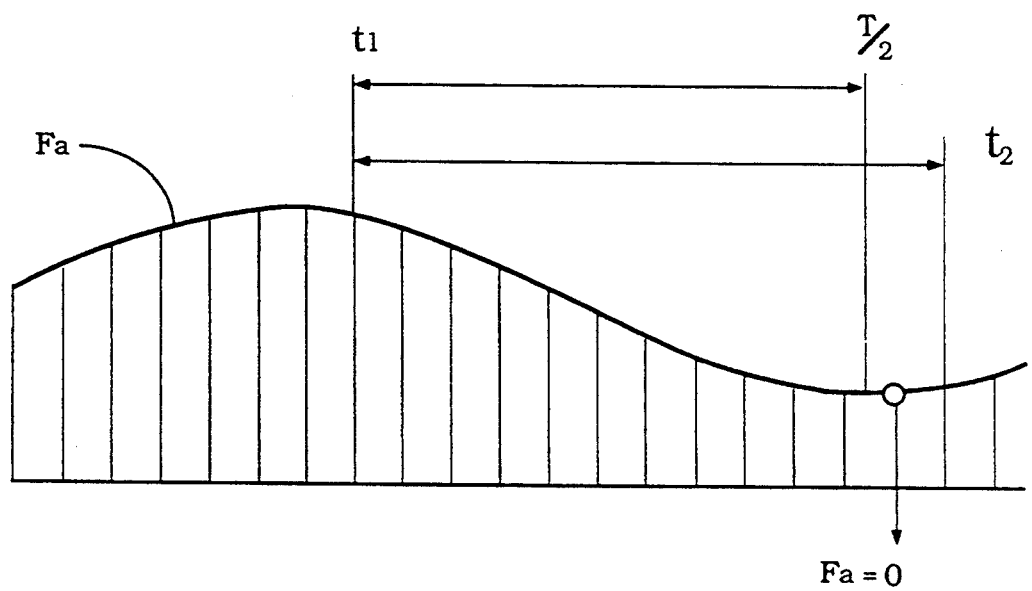
FIG. 14 is a graphical view, in part similar to FIG. 13, and shows one type of malfunction which will be detected.
Figure 15:
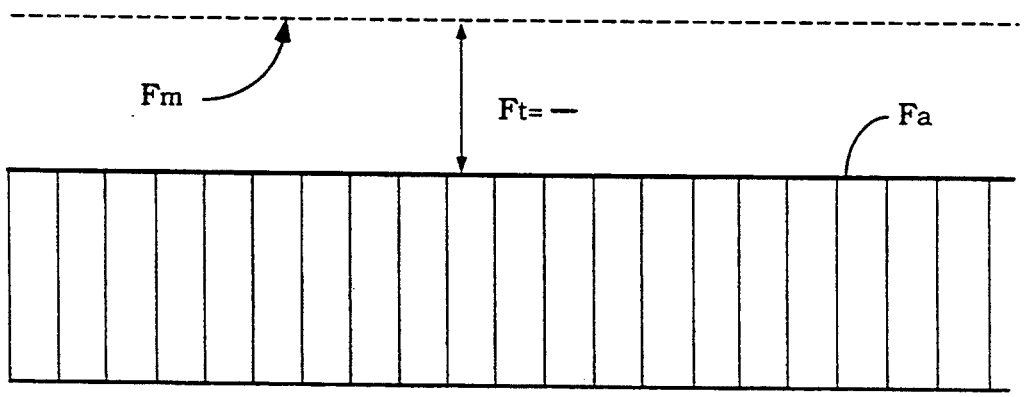
FIG. 15 is a graphical view, in part similar to FIGS. 13 and 14, and shows another type of malfunction which may be detected in accordance with the invention.
Figure 16:
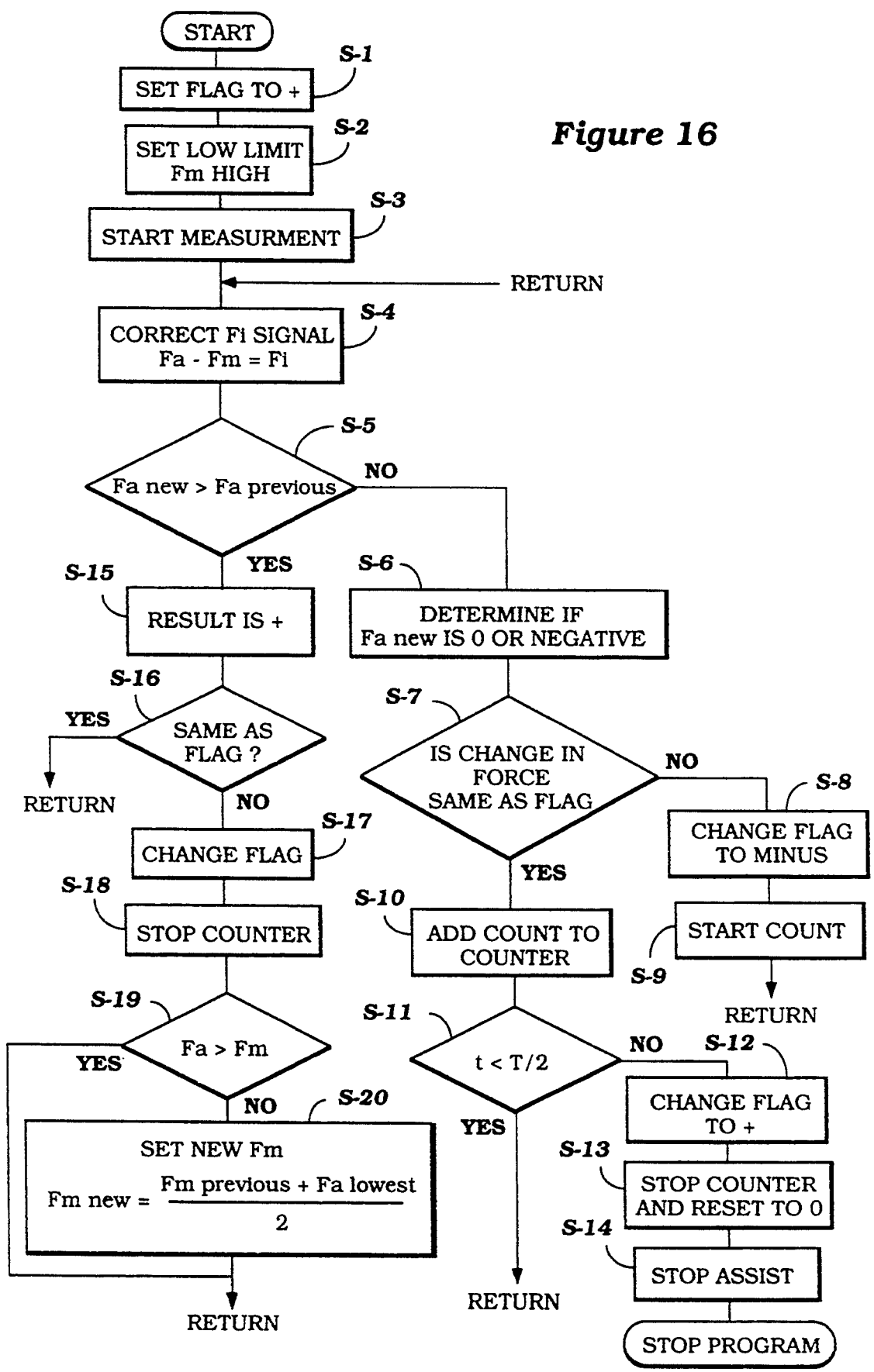
FIG. 16 is a block diagram, in part similar to FIG. 9 and shows the control routine for this embodiment.

FIGS. 14 and 15 show two types of failure modes wherein the system will deactivate the power assist. In the first example of FIG. 14, the time $t_2$ at which the pedal force $F_a$ reaches its minimum is longer than the time T/2 of the half cycle and hence it is determined that no power assist is required because the operator is pedaling quite slowly. Thus, the system will deactivate. FIG. 15 shows a situation wherein the measured pedal force $F_a$ is less than the initially high set minimum force value $F_m$ which would indicate that the torque sensor has been disabled or bypassed and hence no power assist will be provided. The control routine for accomplishing these functions is shown in FIG. 16 and will now be described by particularly reference to that figure.

When the system is originally started up by the turning on of the main switch, the program moves first to the step S-1 so as to set the flag to plus (+). The program then moves to the step S-2 to set an initial relatively high limit for the value $F_m$. It should be noted that the pedal assist value $F_i$ is determined by the difference between the actual detected pedal force $F_a$ and the lower limit pedal force $F_m$. Thus by setting $F_m$ high initially, the amount of initial power assist will be relatively low for the reasons aforenoted.

The program then moves to the step S-3 so as to begin to take measurements of the pedal force $F_a$ and also the bicycle speed S detected by the pedal force sensor 33 and speed detector 67, respectively.

The program then moves to the step S-4 so as to correct the $F_i$ force difference by making a calculation of the difference between the actual pedal force $F_a$ and the set lower limit pedal force $F_m$. This will correct for errors in the potentiometer 64 or for an error in the event the potentiometer 64 is stuck.

The program then moves to the step S-5 to determine if the new pedal force $F_{a\ new}$ is greater than the previously measured pedal force $F_{a\ previous}$. If the new pedal force is not greater than the previous pedal force, then the program moves to a routine beginning at the step S-6 to determine if the new pedal force is either zero (0), because of passing through top or dead center position or is negative (−) as the pedal has moved past the 90° position toward bottom dead center position. To accomplish this, the program moves to the step S-7 to determine if the change in pedal force is the same sign as the flag. If it is not, the program moves to the step S-8 to change the sign of the flag from plus (+) to minus (−) as the flag was initially reset at the step S-2 incorrectly or the pedal force has caused the pedal to move past the 90° position toward bottom dead center position. The program then moves to the step S-9 so as to start counting and then returns back to the step S-4.

If at the step S-7 it is determined that the change in force is the same setting as the flag, then the flag has been set during a previous cycle to minus (−) and the time at which the flag is minus (−) is being counted and the program moves the step S-10 to add a count to the counter. The program then moves to the step S-11 to determine if the time counted "t" is less than the permitted time T/2. If the time is less than the permitted half cycle time, the program then returns back to the step S-4.

If, however, it is determined at the step S-11 that the time t is greater than the permitted half cycle time T/2, the program moves to the step S-12 to begin the routine for power assist stop because the condition is as set forth in FIG. 14 and it is determined that the pedal operator is pedaling very slowly. The program first at the step S-12 changes the flag back to positive (+) and at the step S-13 stops the counter and resets it to zero (0). The program then moves to the step S-14 to stop the power assist and the program then stops.

If at the step S-5 it was determined that the new force $F_{a\ new}$ was greater than the previously measured force $F_{a\ previous}$, then the program determines that the result is positive (+) and moves to the routine starting with the step S-15. The program then moves to the step S-16 to determine if the positive (+) result is reflected in the setting of the flag by comparing the positive (+) result with the flag setting. If the setting is the same as the flag (flag is +), the program returns to the step S-4. If, however, it is determined that the setting is not the same as the flag, then the flag must have been set to negative (−) and the program moves to the step S-17 to change the setting of the flag. The program then moves to the step S-18 to stop the counter. It should be noted that the program actually only measures the time period when the pedal force is decreasing or the half cycle time T/2.

The program then moves to the step S-19 to determine if the actual pedal force $F_a$ is greater than the low limit pedal force $F_m$ which has been previously set. As has been previously noted, the initial setting for the pedal force $F_m$ is relatively high. If, however, the force $F_a$ is not greater than the previously set F value of $F_m$, then a new $F_m$ is set at the step S-20. The step S-20 gradually reduces the value of $F_m$ by taking the previously set value of $F_m$ and averaging it with the lowest measured value of $F_a$. This is done according to the following formula:

$$F_{m\ new} = \frac{F_{m\ previous} + F_{a\ lowest}}{2}$$

The program then repeats to step S-4.

It should be readily apparent from the foregoing description that the described embodiments of the invention are very effective in providing a good electric power assist for a pedal operated vehicle such as a bicycle while at the same time, insuring against excessive power assist during start up and/or excessive power assist due to malfunctions in the potentiometer or against the generation of power assist when the operator wishes to pedal very slowly. Of course, the preceding description is that of preferred embodiments of the invention and various changes and modifications may be made without departing from the spirit and scope of the invention, as defined by the appended claims.

I claim:

1. An electrically assisted pedal operated vehicle having a vehicle propulsion device, pedal means for operation by a rider for driving said propulsion device, force sensing means for providing a signal indicative of the force output from said pedal means in response to that applied by the rider to said pedal means, during each revolution of said pedal means, an electric motor, means for coupling said electric motor to said propulsion device for applying a driving force from said electric motor to said propulsion device, operating means for operating said electric motor in response to the signal from said force sensing means for providing an electric motor assist to the pedal operation of said propulsion device, means for determining a predetermined condition and means for comparing the signal from said force sensing means during a single revolution of said pedal means with the predetermined condition for varying the operation of said operating means to change the amount of assist provided by said electric motor during a single revolution of said pedal means in the event of a predetermined condition.

2. An electrically assisted pedal operated vehicle as set forth in claim 1 wherein the pedal means is carried by a crank rotatably about a crank axis so the force output of the pedal will vary cyclically depending upon the angular rotation of the crank.

3. An electrically assisted pedal operated vehicle as set forth in claim 2 wherein the predetermined condition determined comprises a minimum force and a maximum force output of the pedal means during a single revolution of said pedal means.

4. An electrically assisted pedal operated vehicle as set forth in claim 3 wherein the operating means does not provide a power assist unless the comparing means determines that the force the pedal means exceeds a predetermined minimum value during the single revolution.

5. An electrically assisted pedal operated vehicle as set forth in claim 4 wherein the means for comparing establishes a relatively high minimum value during initial start up of the operation to avoid too sudden an application of power by the electric motor.

6. An electrically assisted pedal operated vehicle as set forth in claim 2 wherein the means for comparing will not permit the exertion of an electric motor assist until a predetermined minimum pedal force is output.

7. An electrically assisted pedal operated vehicle as set forth in claim 6 wherein the predetermined minimum pedal force is the lowest anticipated pedaling force to be output by the pedal means.

8. An electrically assisted pedal operated vehicle as set forth in claim 1 wherein the means for comparing will not permit operation of the electric motor until a predetermined force is output by the pedals means.

9. An electrically assisted pedal operated vehicle as set forth in claim 8 wherein the predetermined minimum force is established initially at a high value during start up so as to preclude the sudden application of large amounts of initial electric motor assist.

10. An electrically assisted pedal operated vehicle as set forth in claim 9 wherein the minimum pedal output force required for the exertion of electric motor assist is gradually reduced after start up by averaging the previously set minimum force with the minimum force output from the pedal means at the last previous cycle.

11. An electrically assisted pedal operated vehicle as set forth in claim 1 wherein the means for comparing compares the time between a maximum force output by the pedal means and a minimum force output by the pedal means.

12. An electrically assisted pedal operated vehicle as set forth in claim 11 wherein the means for comparing precludes the exertion of electric motor for power assist if the time between the maximum output and minimum forces exceeds a predetermined time limit.

13. An electrically assisted pedal operated vehicle as set forth in claim 12 wherein the time limit is measured between the time when the pedal output force is at its greatest and the pedal outputs force is at its least.

14. An electrically assisted pedal operated vehicle as set forth in claim 13 wherein the electric motor assist is not permitted if the time between the maximum pedal outputs force and the minimum pedal force exceeds a predetermined time period.

15. An electrically assisted pedal operated vehicle as set forth in claim 14 wherein the system will not provide electric motor assistance even if the pedal output force varies between the maximum and the minimum within a predetermined time but does not exceed a predetermined minimum output force.

16. A method of operating an electrically assisted pedal operated vehicle having a vehicle propulsion device, pedal means for operation by a rider for driving said propulsion device, force sensing means for providing a signal indicative of the force output of said pedal means during a single revolution, an electric motor, means for coupling said electric motor to said propulsion device for applying a driving force from said electric motor to said propulsion device, said method comprising the steps of operating said electric motor in response to the signal from said force sensing means for providing an electric motor assist to the pedal operation of said propulsion device, and comparing the signal from said force sensing means with a predetermined condition for varying the operation of said operating means to change the amount of assist provided by said electric motor in the event of a predetermined condition.

17. A method of operating an electrically assisted pedal operated vehicle as set forth in claim 16 wherein the predetermined condition comprises the varying of the output force of the pedal between a minimum force and a maximum force.

18. A method of operating an electrically assisted pedal operated vehicle as set forth in claim 17 wherein the pedal assist is not provided unless the force applied to the pedals exceeds a predetermined minimum value.

19. A method of operating an electrically assisted pedal operated vehicle as set forth in claim 18 wherein a relatively high minimum value is set for the comparing means during initial start up of the operation to avoid too sudden an application of power by the electric motor.

20. A method of operating an electrically assisted pedal operated vehicle as set forth in claim 16 wherein the pedal assist is not provided by the electric motor until a predetermined minimum pedal force is exerted.

21. A method of operating an electrically assisted pedal operated vehicle as set forth in claim 20 wherein the predetermined minimum pedal force is the lowest anticipated pedaling force to be exerted by the operator.

22. A method of operating an electrically assisted pedal operated vehicle as set forth in claim 16 wherein operation of the electric motor is not initiated until a predetermined force is exerted on the pedal means.

23. A method of operating an electrically assisted pedal operated vehicle as set forth in claim 22 wherein the predetermined minimum force is set initially at a high value during start up so as to preclude the sudden application of large amounts of initial electric motor assist.

24. A method of operating an electrically assisted pedal operated vehicle as set forth in claim 23 wherein the minimum pedal force required for the exertion of electric motor assist is gradually reduced after start up by averaging the previously set minimum force with the minimum force exerted on the pedal means at the last previous cycle.

25. A method of operating an electrically assisted pedal operated vehicle as set forth in claim 16 wherein the time between a maximum force output at the pedal and a minimum force output at the pedal is measured.

26. A method of operating an electrically assisted pedal operated vehicle as set forth in claim 25 wherein the exertion of electric motor power assist is precluded if the time between the maximum and minimum forces exceeds a predetermined time limit.

27. A method of operating an electrically assisted pedal operated vehicle as set forth in claim 26 wherein the time limit is measured between the time when the pedal force is at its greatest and the pedal force is at its least.

28. A method of operating an electrically assisted pedal operated vehicle as set forth in claim 27 wherein the electric motor assist is not permitted if the time between the maximum pedal force and the minimum pedal force exceeds a predetermined time period.

29. A method of operating an electrically assisted pedal operated vehicle as set forth in claim 28 wherein electric motor assistance is not provided even if the pedal force varies between the maximum and the minimum within a predetermined time but does not exceed a predetermined minimum force.

* * * * *